United States Patent
Saunders et al.

(10) Patent No.: US 7,526,892 B2
(45) Date of Patent: May 5, 2009

(54) POWERED GARDEN OR LAWN EDGING ASSEMBLY

(75) Inventors: Craig M. Saunders, Rocky River, OH (US); Lindsey Tufts, Jr., Eastlake, OH (US); Jayson C. Simeon, Lakewood, OH (US)

(73) Assignee: Nottingham-Spirk Design Associates, Inc., Cleveland, OH (US)

( * ) Notice: Subject to any disclaimer, the term of this patent is extended or adjusted under 35 U.S.C. 154(b) by 706 days.

(21) Appl. No.: 11/287,527

(22) Filed: Nov. 23, 2005

(65) Prior Publication Data

US 2006/0150479 A1 Jul. 13, 2006

(51) Int. Cl.
*A01G 1/00* (2006.01)
(52) U.S. Cl. .......................................................... 47/33
(58) Field of Classification Search ................... 47/33
See application file for complete search history.

(56) References Cited

U.S. PATENT DOCUMENTS 1,795,589 A * 3/1931 Zolla ........................... 403/217
5,438,804 A * 8/1995 Reum et al. .................... 52/102
5,442,877 A * 8/1995 Lindhal ........................... 47/33
6,138,405 A * 10/2000 Matz ............................... 47/33
6,925,753 B1 8/2005 Mallory
2005/0150158 A1 7/2005 Fakhari

FOREIGN PATENT DOCUMENTS

GB 2 389 024 A 12/2003

\* cited by examiner

*Primary Examiner*—Francis T Palo
(74) *Attorney, Agent, or Firm*—Fay Sharpe LLP

(57) ABSTRACT

A powered edging assembly for providing a voltage source at an edge of a garden or lawn having an edging extrusion configured for in-ground placement at the edge and including an above-ground upper portion having contained wires extending along a length of the extrusion; the wires being insulated by penetrable sheaths. An electrically powered device is selectively positionable and fastenable on the extrusion, whereby contacts for the device penetrate the sheaths for communicating electrical power from the wires to the device.

26 Claims, 15 Drawing Sheets

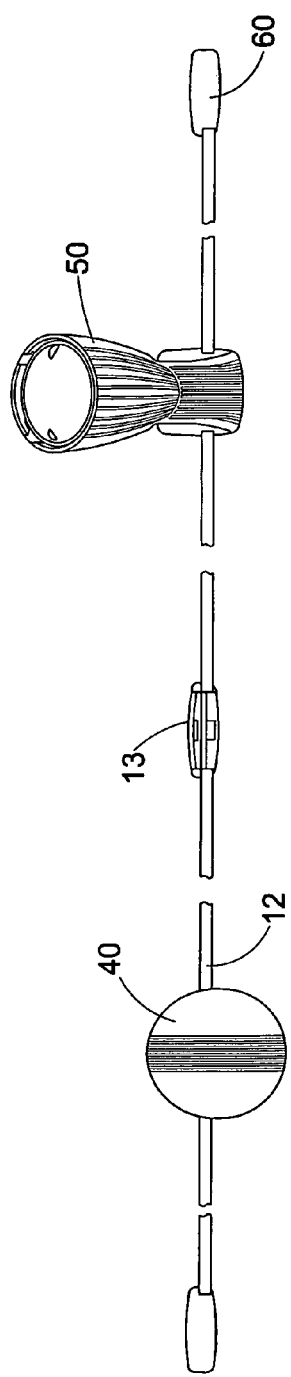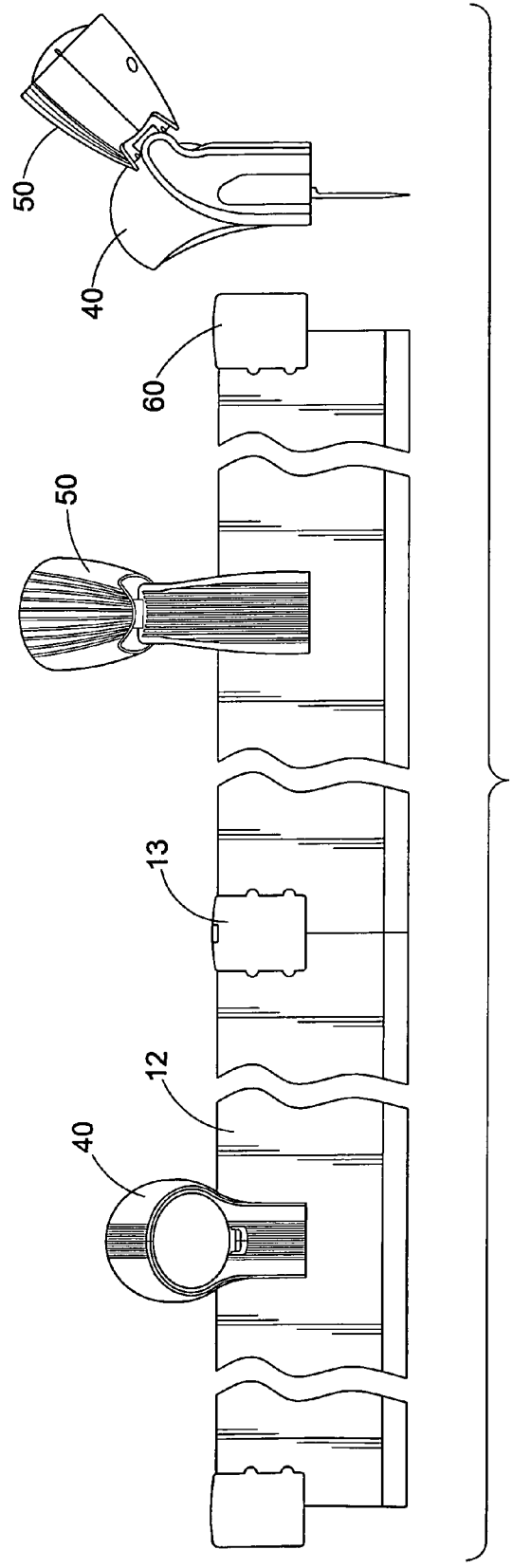
FIG. 1B
FIG. 1C

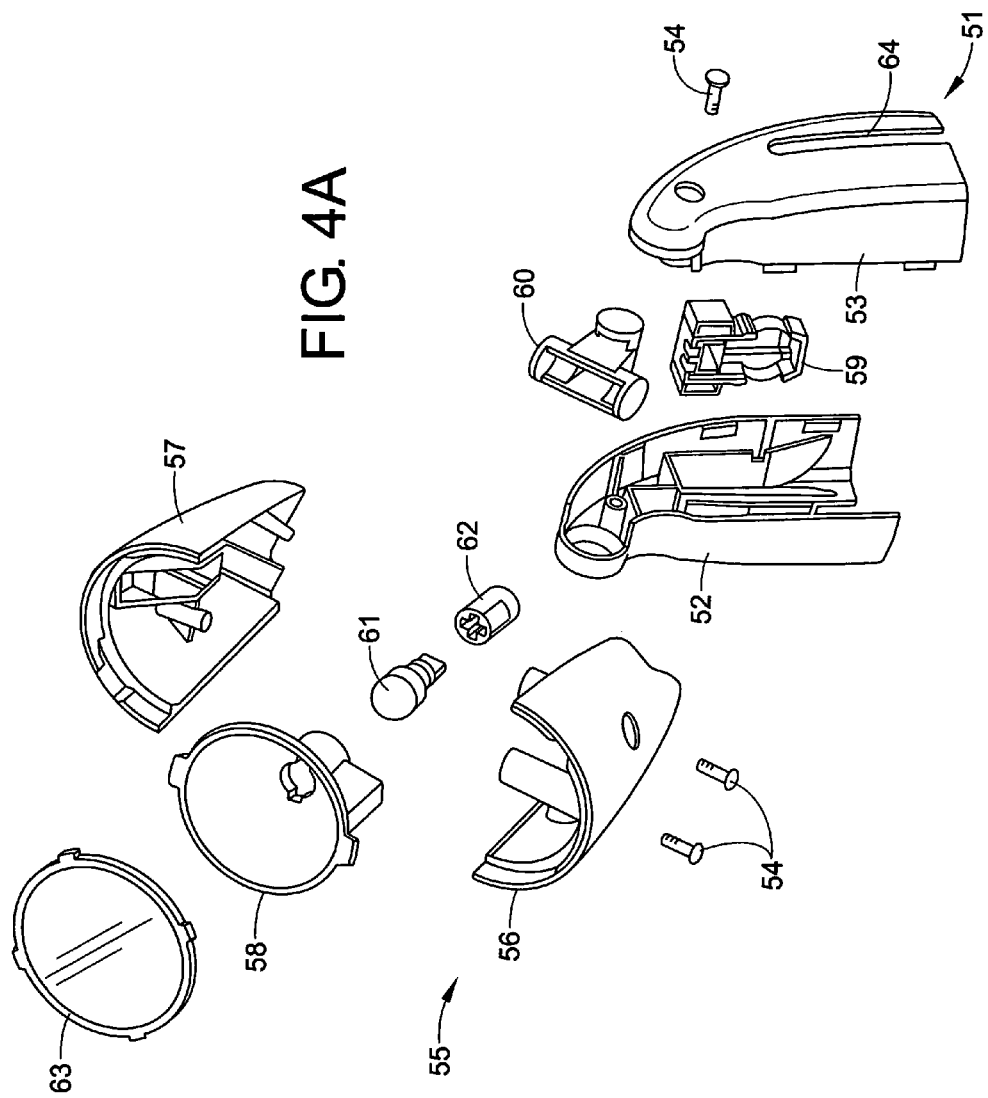

POWERED GARDEN OR LAWN EDGING ASSEMBLY

FIELD OF THE INVENTION

This invention relates generally to landscape maintenance and more particularly to a lawn and garden edging device for use adjacent borders of walks and plant beds with provisions for attachment of watering and/or lighting components.

BACKGROUND

Lawn edging devices are well known for their ability to restrict the growth of grass, weeds, or other vegetation by providing a barrier that extends above or below the ground level. Edging devices are particularly adapted for use along walkways, gardens and flower beds providing a distinct divider where desired. When properly installed, an edging device further provides an aesthetically pleasing border that enhances a lawn or garden, as well as providing lighting for illuminating the garden or adjacent pathway. Examples of edging systems which also provide lighting or other electrical systems are shown in Published Application US 2005/0150158, U.S. Pat. No. 6,925,753 and GB Patent No. 2,389,024, each of which is incorporated by reference herein.

SUMMARY OF THE INVENTION

The edging of the present invention provides a passageway for electrical wiring allowing for the placement of discretely positioned illuminating lights or sensors along the length of the edging apparatus.

The present invention provides low-voltage power at the edge of a garden or lawn. This allows the consumer the ability to add lighting on either side of the garden edging at any place desired (walkways, by trees, highlighting plants, flowers, etc.). It essentially provides low-voltage track lighting power to be tapped from either side of the edging as well as allowing it to bend and flex. A series of end caps, splices and initial power hookups allow the consumer to put together the system easily. There is also the ability to add other powered accessory items, such as electronic pest controls, holiday lighting, windmills, motorized owls, etc. Two other versions would include a "snap-on" version for use on existing edging, and an "all-in-one" version that includes a separate water and electric channel in the same extruded edging.

Thus, in accordance with one aspect of the present invention, a powered edging assembly for providing a voltage source at an edge of a garden or lawn has an edging extrusion configured for in-ground placement at the edge and including an above-ground upper portion having contained wires extending along a length of the extrusion; the wires being insulated by penetrable sheaths; and an electrically powered device selectively positionable and fastenable on the extrusion, whereby contacts for the device penetrate the sheaths for communicating electrical power from the wires to the device.

Still other aspects and advantages of the invention will become apparent to those skilled in the art upon a reading and understanding the following detailed description.

BRIEF DESCRIPTION OF THE DRAWINGS

The invention may take form in certain components and structures, several preferred embodiments of which will be illustrated in the accompanying drawings wherein:

FIG. 1B is a top plan view of the assembly of FIG. 1A;

FIG. 1C is a front elevational view of the assembly of FIG. 1A;

FIG. 4A is an exploded perspective view of a spot light assembly used with the assembly of FIG. 1A;

DETAILED DESCRIPTION OF THE PREFERRED EMBODIMENTS

Figure 1A:
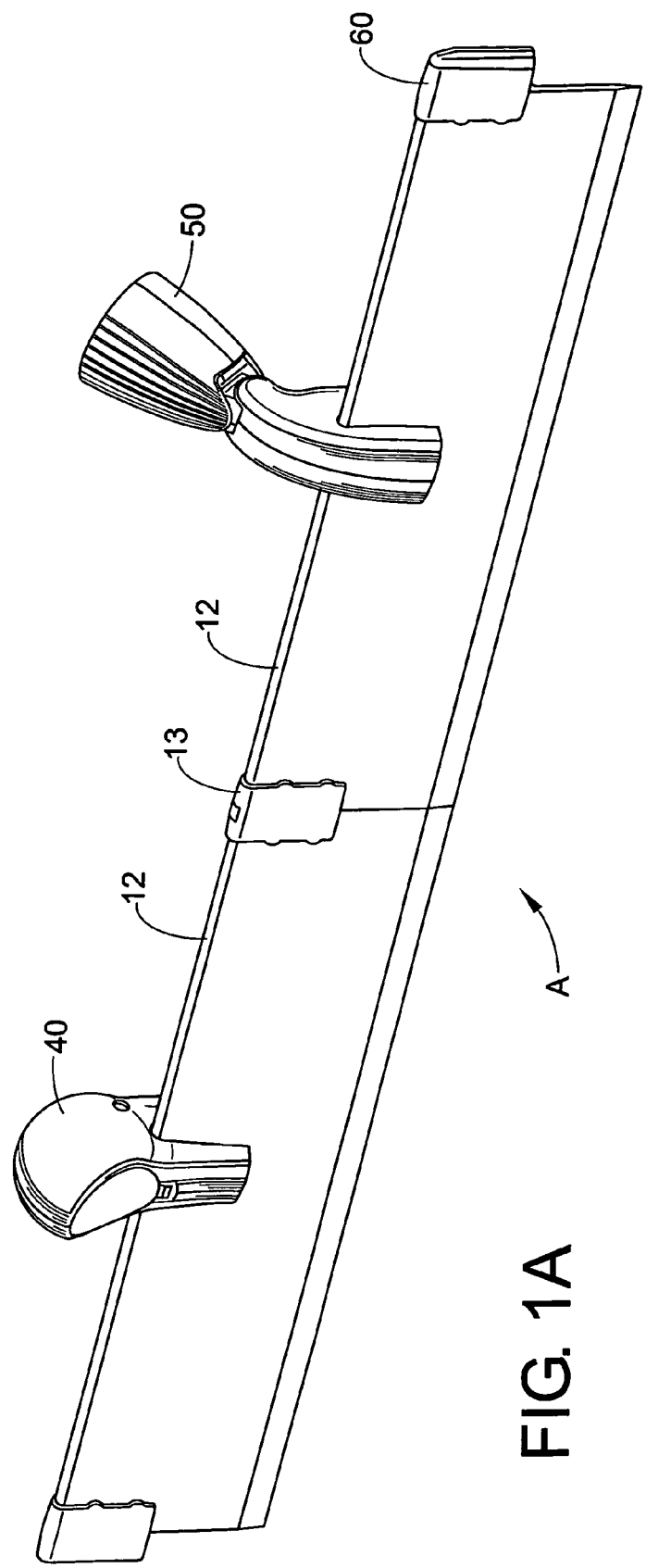
FIG. 1A is a perspective view of a lawn edging assembly in accordance with a first embodiment of the present invention.

Referring now to the drawings, wherein the showings are for purposes of illustrating the preferred embodiments of this invention only and not for purposes of limiting same, referring to FIGS. 1A-1D and 2, the lawn and garden edging assembly of the present invention is shown. The edging 10 includes a series of extruded strips 12 which are clipped or secured together by edging connectors 13 each of which has a front member 14 and a rear member 16 which are joined together by pegs or posts 18 which protrude from member 14, through holes 20 in the edging, and into apertures 22 formed in rear member 16.

A power strip or sheath 24 extends along the length of the edging strips 12 and is received in a c-shaped groove 26 formed on an upper edge of the strips.

Mounting blocks 30 and inserts 32 are provided for installing light fixtures to the edging strips. The blocks and inserts allow lighting assemblies to be secured to the edging strips and connect to lighting fixtures to the power cord. The blocks are inserted onto the strips via slot 31 on the block.

Figure 1D:
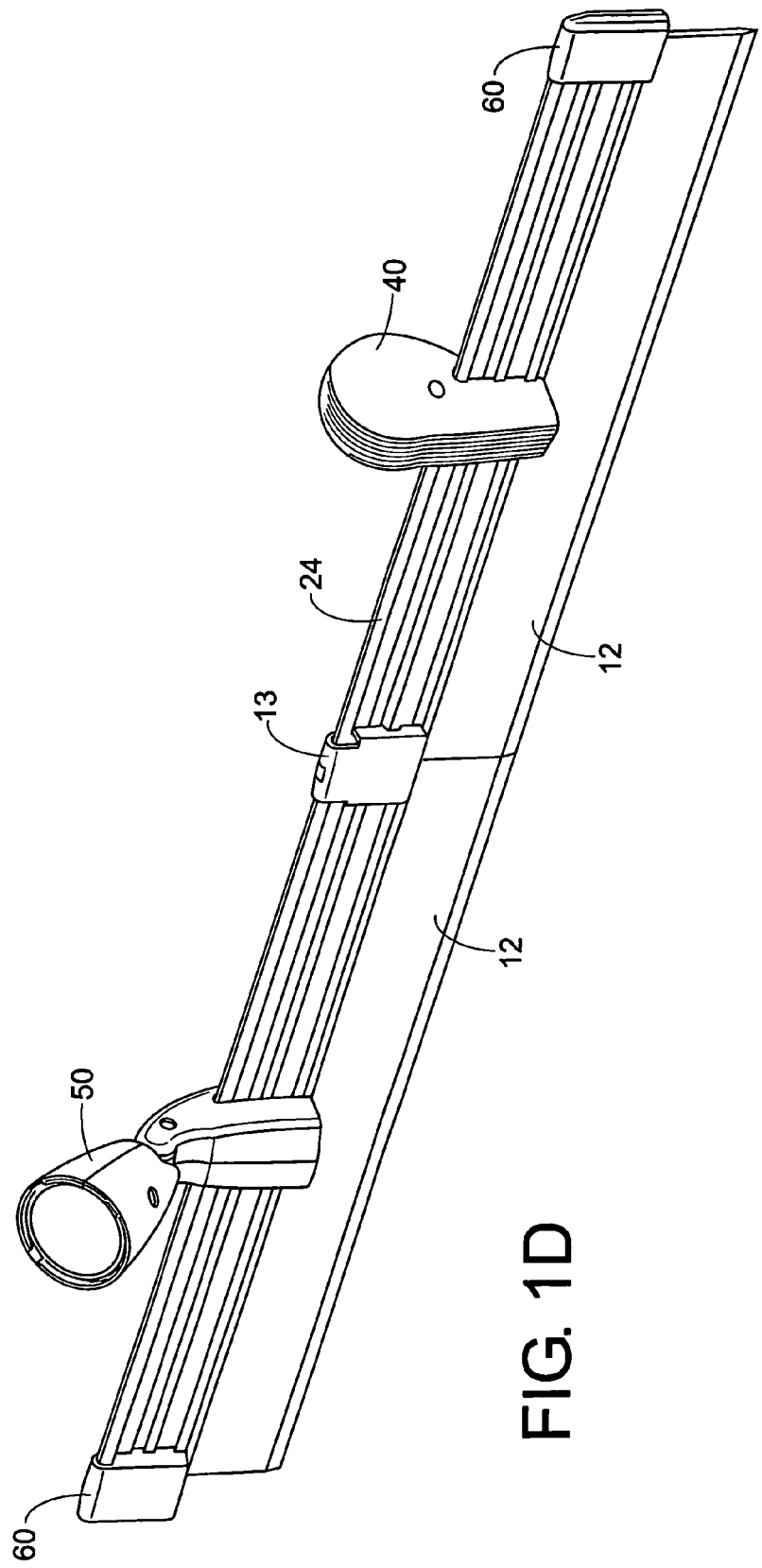
FIG. 1D is a perspective view of the assembly of FIG. 1A from an opposite side.
Figure 2:
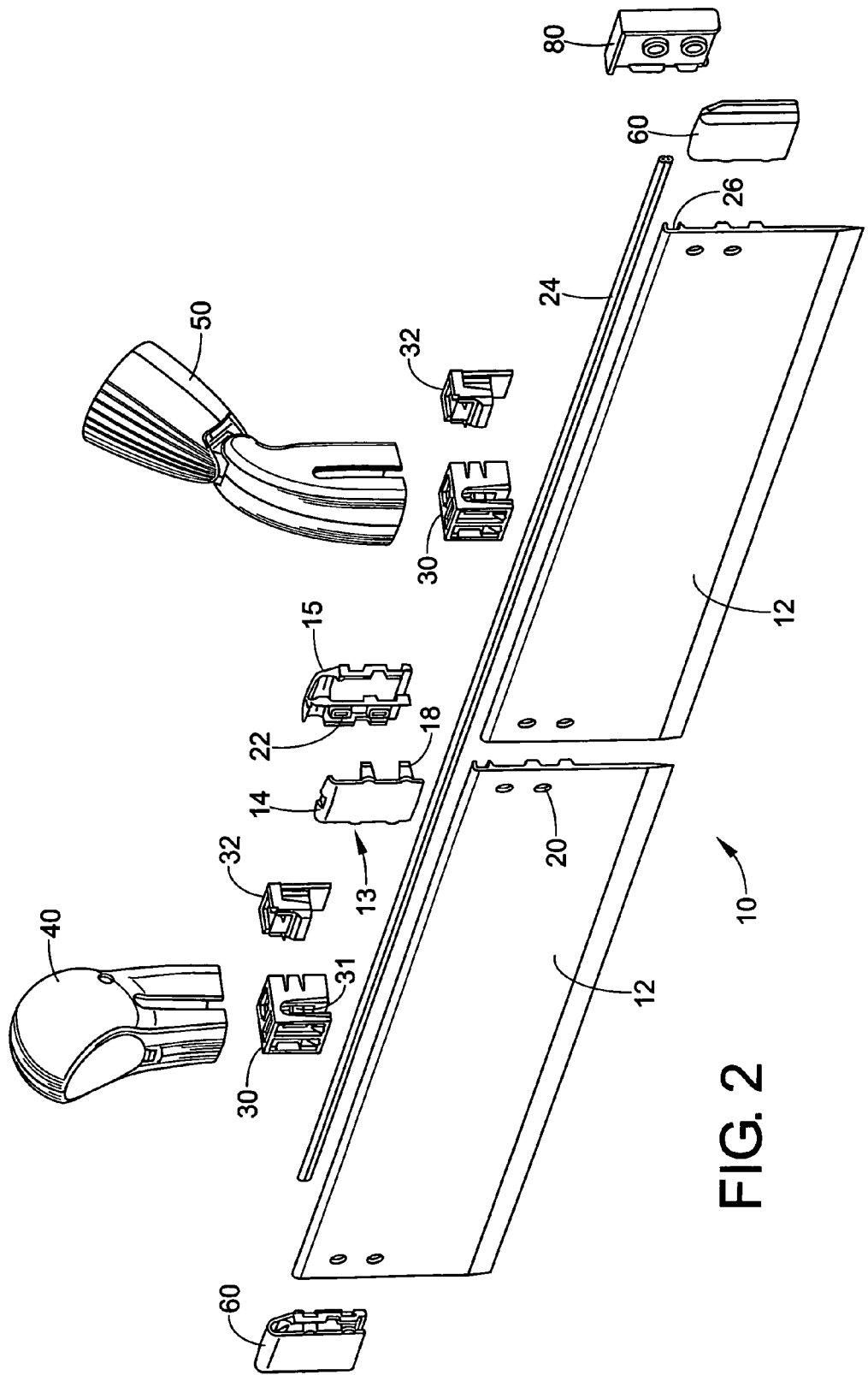
FIG. 2 is an exploded elevational view of the assembly of FIG. 1A

One of the light fixtures can be a walkway light assembly 40. Another type of light fixture is a spotlight assembly 50. End caps 60 are provided on ends of the steps as shown in FIGS. 1A and 1D. A drill template 80 can be provided for the end cap assembly.

FIG. 1 shows an edging system 10 which includes a length of flexible edging in the form of strips 12 formed of plastic. A lower portion of the edging 12 is underground in the typical application. The edging is flexible and can bend at a curve to go around an obstacle such as a tree. Stakes can be provided for securing the edging to the ground.

The edging 12 includes one or more electrical wires or conductors which are embedded in a power strip 24 on the edging and are usable to supply electric current from a power source to low voltage outdoor lighting or for other applications or circuits. The power strip can run the full length of the edging. The power strip can have electrical conductors formed of metal wire, such as copper wire. Alternatively, both conductors or wires may be embedded in the edging in closely spaced and parallel relation near a top edge of the edging, near the bottom edge, or anywhere in between.

The edging strips can be made of rigid plastic and is generally very tough but can be subject to crushing from a blow applied to an edge such as the top edge during installation. If positioned near the top edge and the bottom edge of the edging, the wires in the power strip 24 can also act as structural supports to strengthen the edges and lessen damage which might be caused when the edging is driven into the ground. It has been found that a copper wire is capable of strengthening the top edge of the edging to lessen damage to the edging caused when a user drives the lawn edging into the ground.

The edging can vary in thickness in a range of $1/16^{th}$ inches to $3/8$ inches or more. The wire can range in thickness up to just under the overall thickness of the edging give ideal strength, flexibility and manufacturability of the wire and of the resulting edging.

An edging connector or clip 13 can hold together two edging strips 12 and and cover the joint between them. The clip 13 can slide onto either piece. End caps 60 can include contacts that can be used to conduct low voltage electricity to or from the wires in the power strip. Contacts can conduct low voltage electricity in the form of one polarity of low voltage DC electricity to wire and an opposite polarity to power lights clipped to the edging pieces. This arrangement could be used for solar lawn lights, Christmas lights or for low voltage Malibu lights for example. The arrangement can be use to conduct low voltage electricity for any purpose. The end cap 60 can serve to connect the two pieces 12 to protect the wire and to connect wire in the power strips to conduct electricity for lighting or other purposes. The arrangement provides for lawn edging and for an electrically conductive strip where the power strip insulates the wires inside the edging strips 12.

Figure 3A:
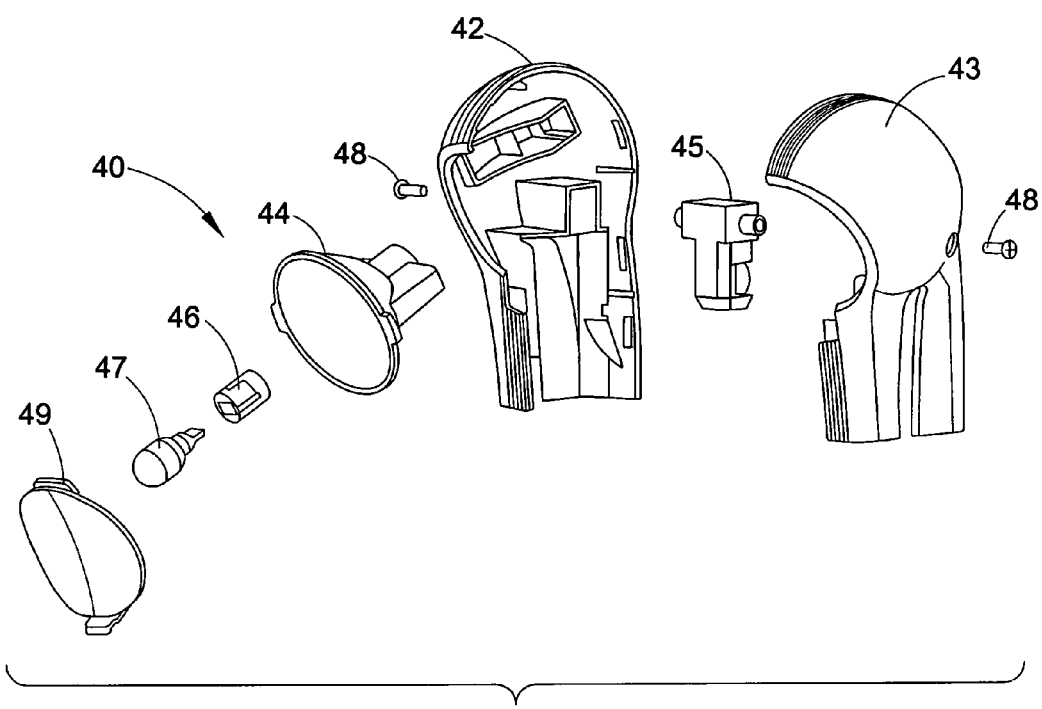
FIG. 3A is an exploded perspective view of the walkway light assembly used with the edging assembly used with the edging assembly of FIG. 1A.
Figure 3C:
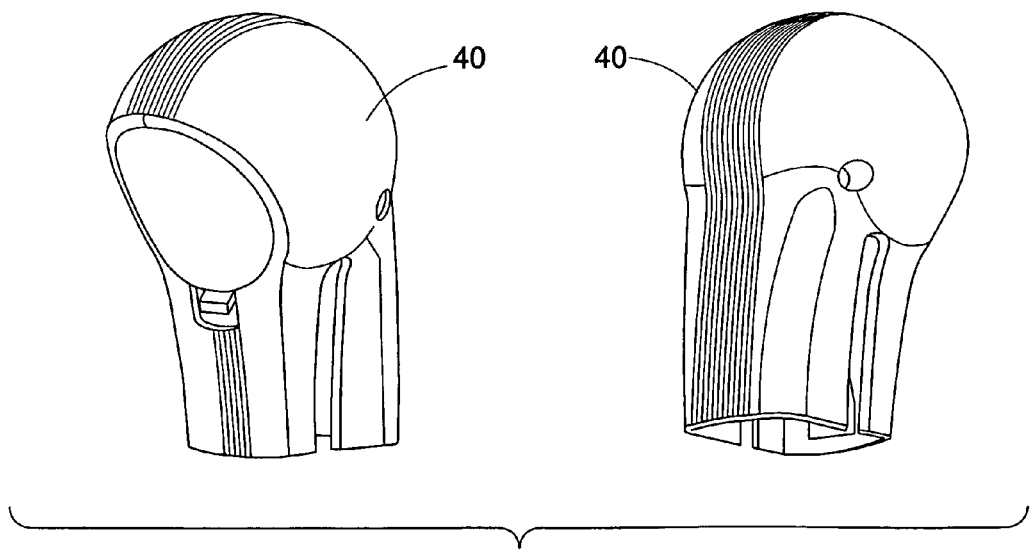
FIG. 3C shows front and back elevational views of the light assembly of FIG. 3A.
Figure 3B:
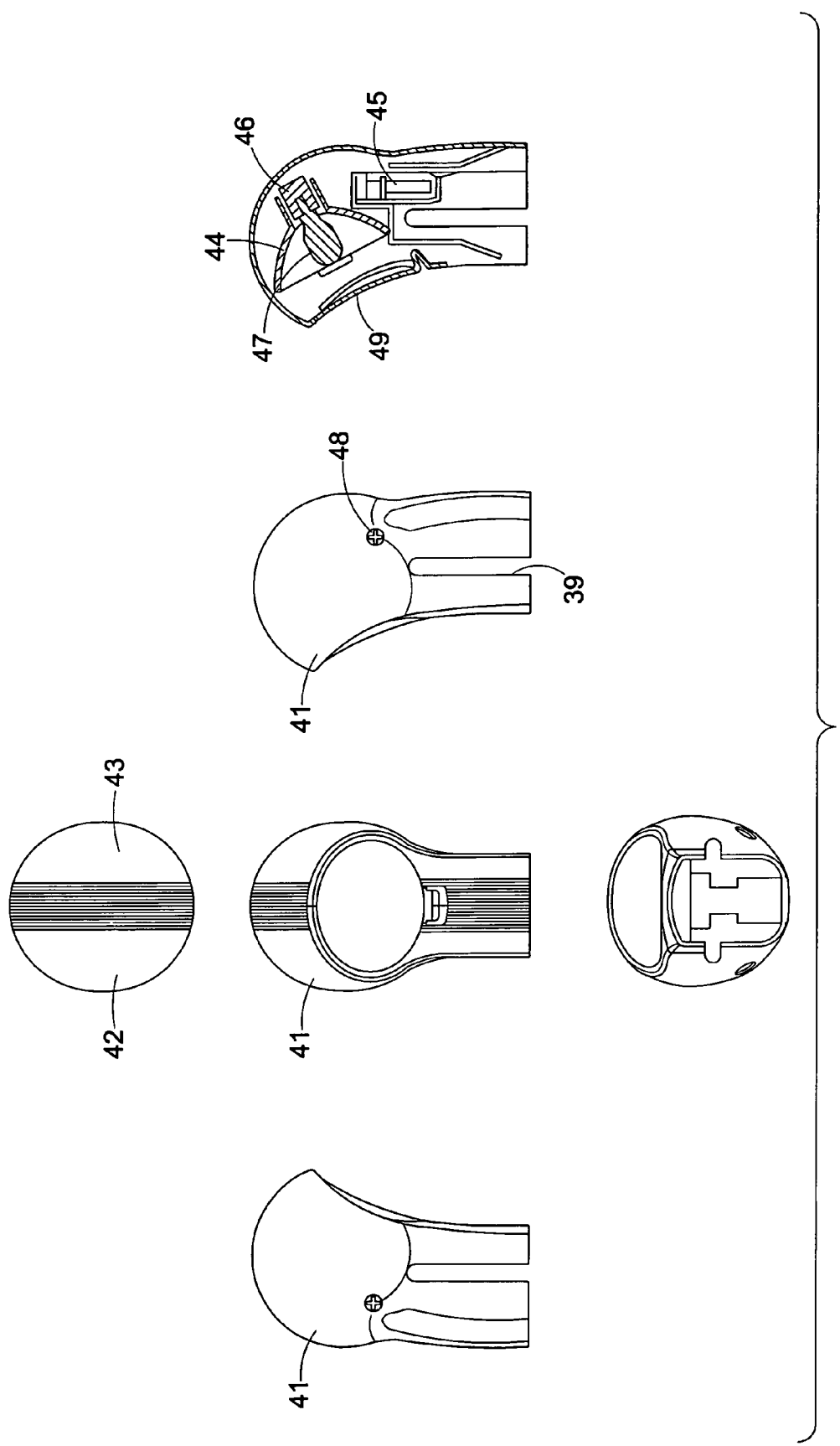
FIG. 3B shows front, left and right side and top and bottom plan views of the light assembly of FIG. 3A.

Referring now to FIGS. 3A-3C, the walkway light assembly 40 is shown. The walkway light has a plastic or metal housing 41 formed of two halves 42, 43, which enclose a reflector 44 in a cavity therein and a plug 45 which connects the light to the power cord 24. A socket assembly 46 for a light bulb 47 is positioned within the reflector. Several screws 48 are used to mount the two housing halves to each other. Finally, a lens 49 is positioned on the outer edge of the reflector and above or over the light bulb in an opening in the housing. The housing has a slot or groove 39 which allows the light to be installed onto the edging strip 12.

Figure 4B:
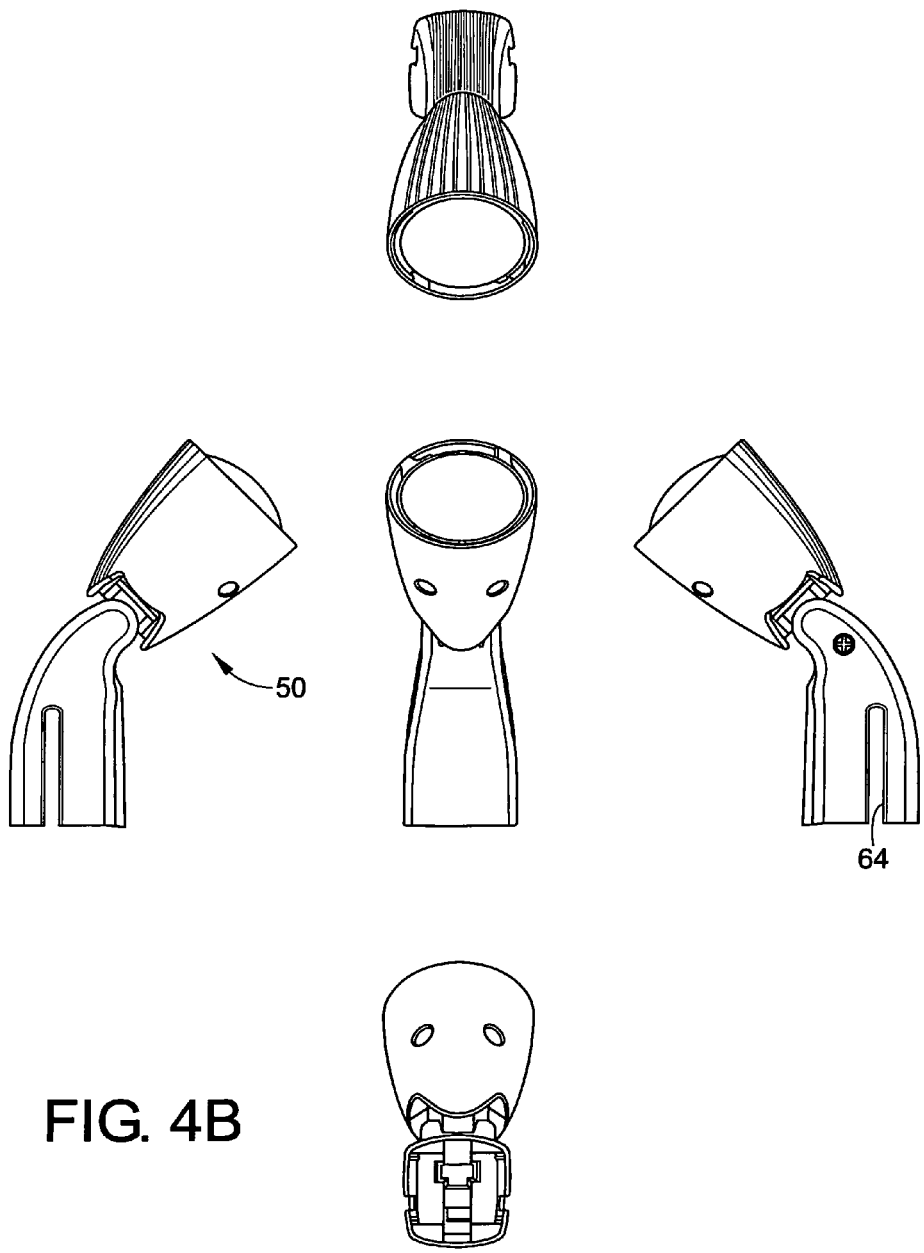
FIG. 4B shows front, left, right, top and bottom plan views of the spot light assembly of FIG. 4A.
Figure 4C:
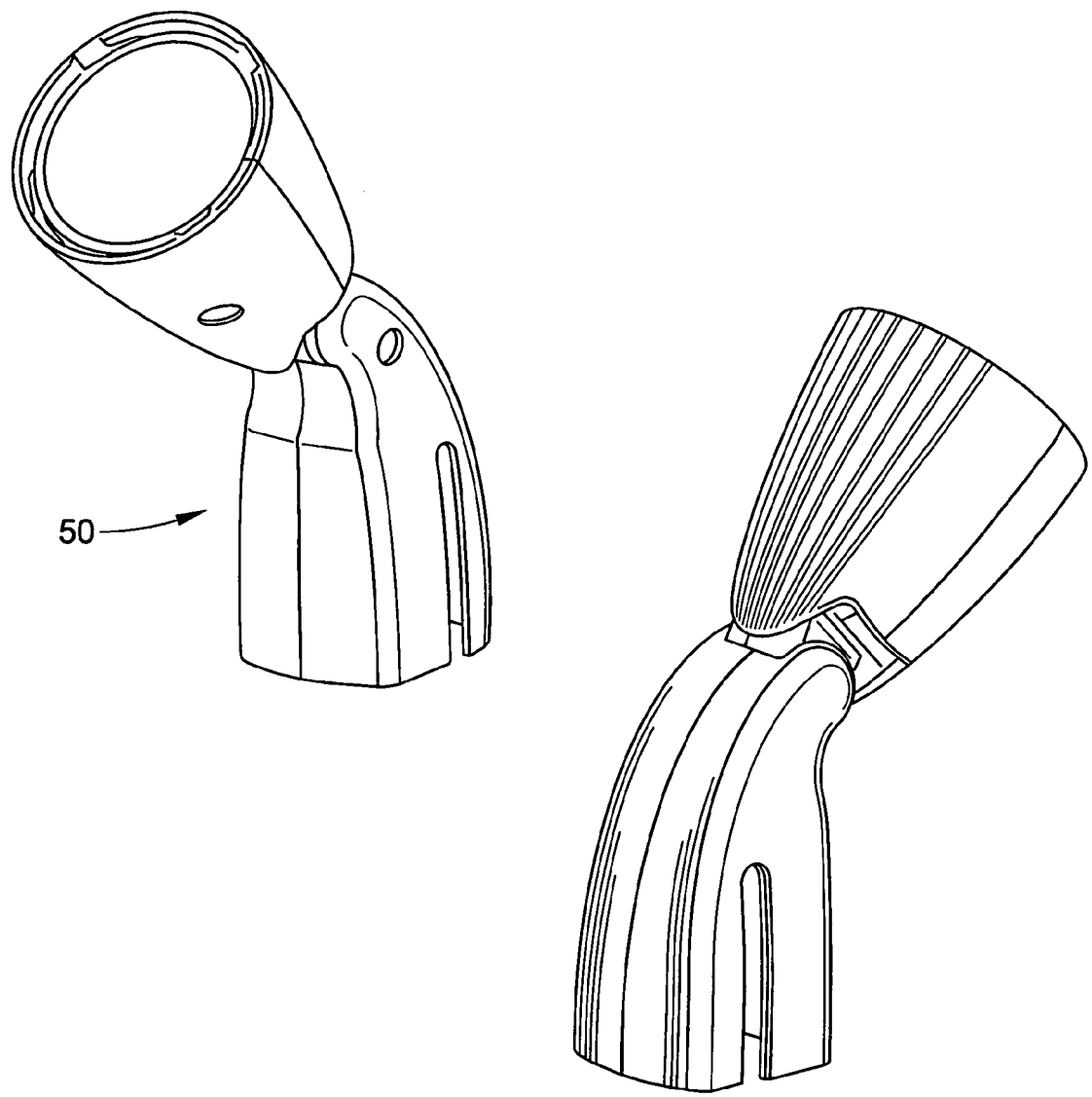
FIG. 4C shows front and back elevational views of the spot light of FIG. 4A.

Referring now to FIGS. 4A-4C, the spotlight assembly 50 is shown. The spotlight assembly has a plastic or metal first or lower housing 51 formed of two halves 52, 53 which are secured together via self tapping screws 54. A second, or upper reflector housing 55 is formed also of two halves 56, 56 of plastic or metal which houses reflector 58 in a cavity of the housing. Reflector housing halves are also secured to each other via screws 54.

A plug assembly 59 is mounted within the housing 51 to connect the spotlight to the power strip 24. The housing 51 is connected to the reflector housing 55 via a yoke 60 which enables pivotable adjustment of the reflector housing with respect to the housing.

A light bulb 61 is connected to a socket 62 within the reflector housing. A spotlight lens 63 covers the light bulb and mounts within an opening of reflector housing. The lens 63 may be curved in shape. The housing 51 has a slot or groove 64 which allows the light to be installed onto the edging strip 12.

FIGS. 5-10 illustrate alternate embodiments of the spotlight, as well as a walkway light, a path light, and a sonic horn. Other variations of lighting systems for the garden or lawn edging are also contemplated by the inventor.

Figure 5:
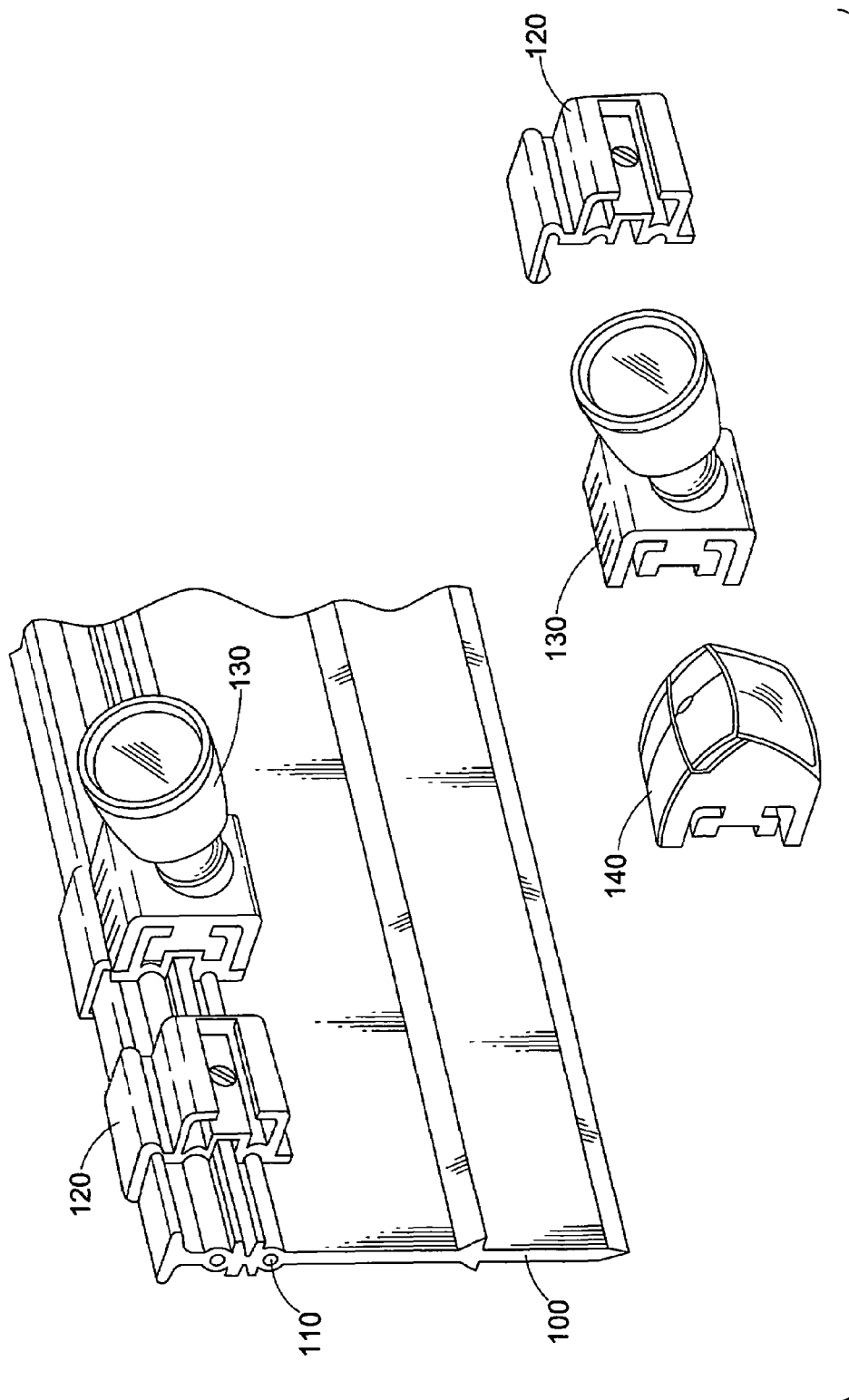
FIG. 5 illustrates an alternate embodiment of the spot light and walkway lights used with an edging system.

FIG. 5 shows a symmetrical edging extrusion 100 with molded in wire 110 and a power tap adapter 120 which fits on either side of the extrusion. An adjustable spot light 130, or a walkway light 140 may be installed on the extrusion.

Figure 6:
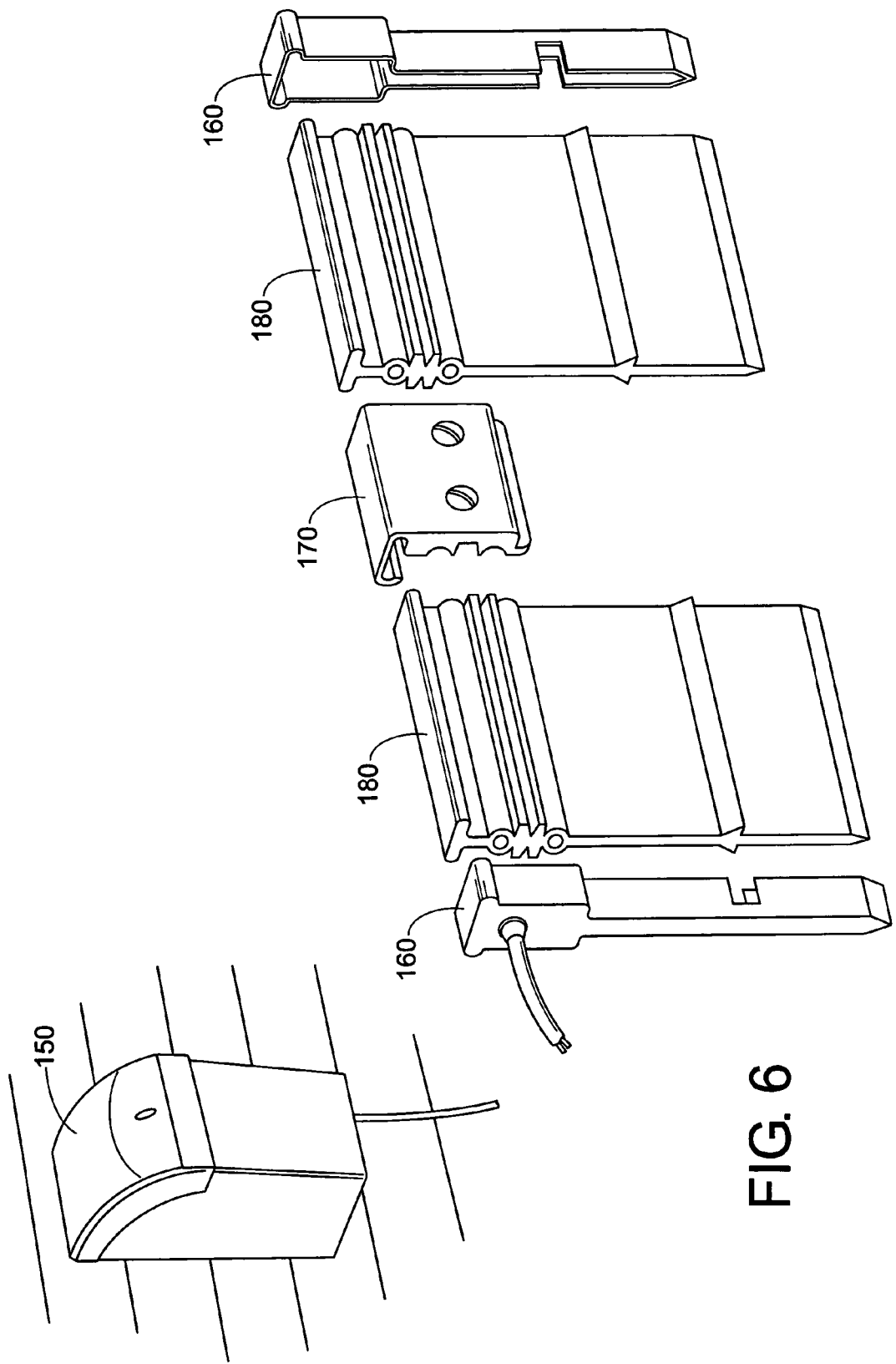
FIG. 6 illustrates a power box and end cap with power load to be used with the edging assembly.

FIG. 6 shows an AC power box 150 with a timer control used with an end cap 160 with a power load. The end cap adapter also can close the current. A splice adapter 170 is used to connect extrusions 180 together.

Figure 7:
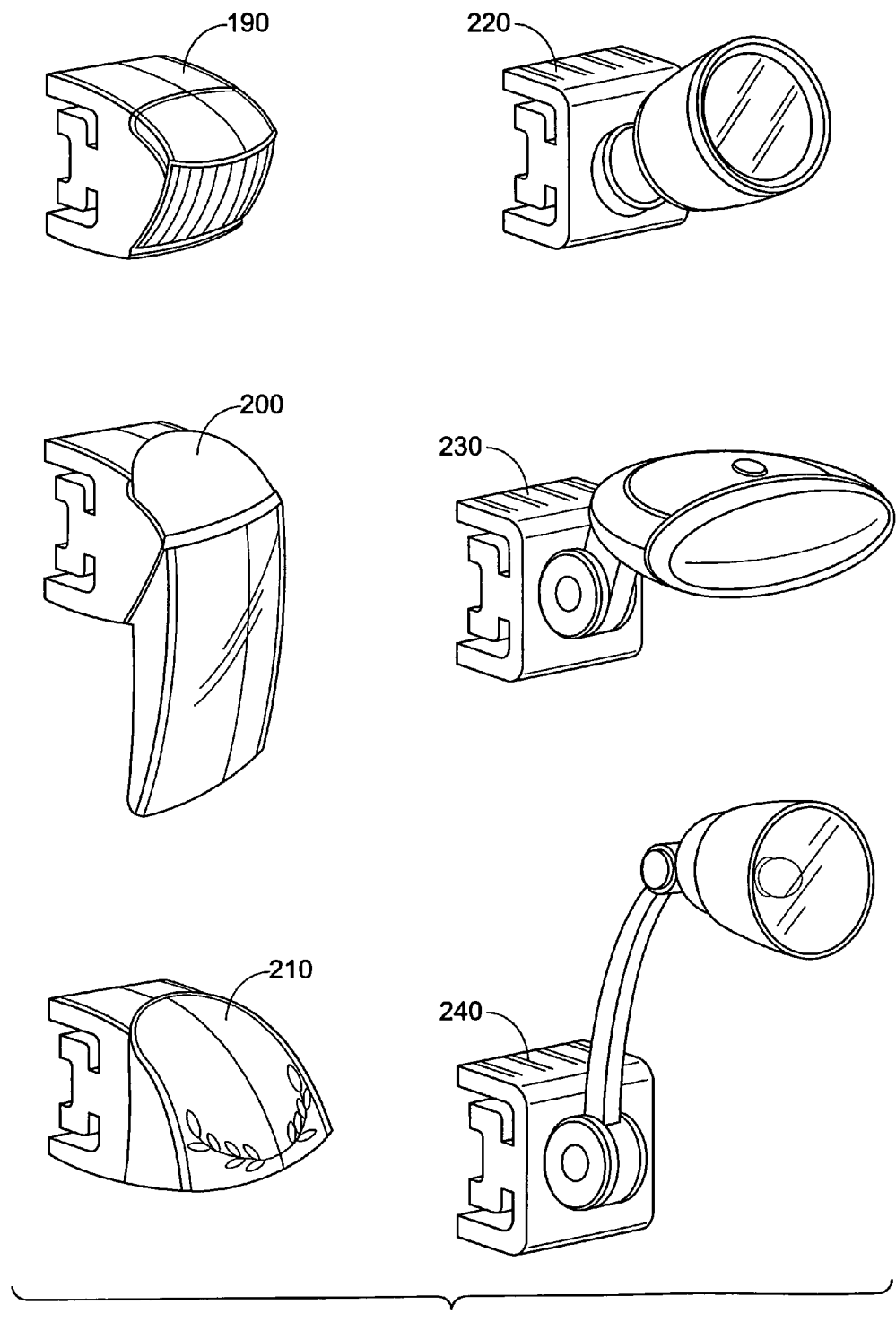
FIG. 7 illustrates alternate embodiments of the path light and spot light assemblies.

FIG. 7 shows various embodiments of path lights 190, 200, 210 and spot lights 220, 230, 240.

Figure 8:
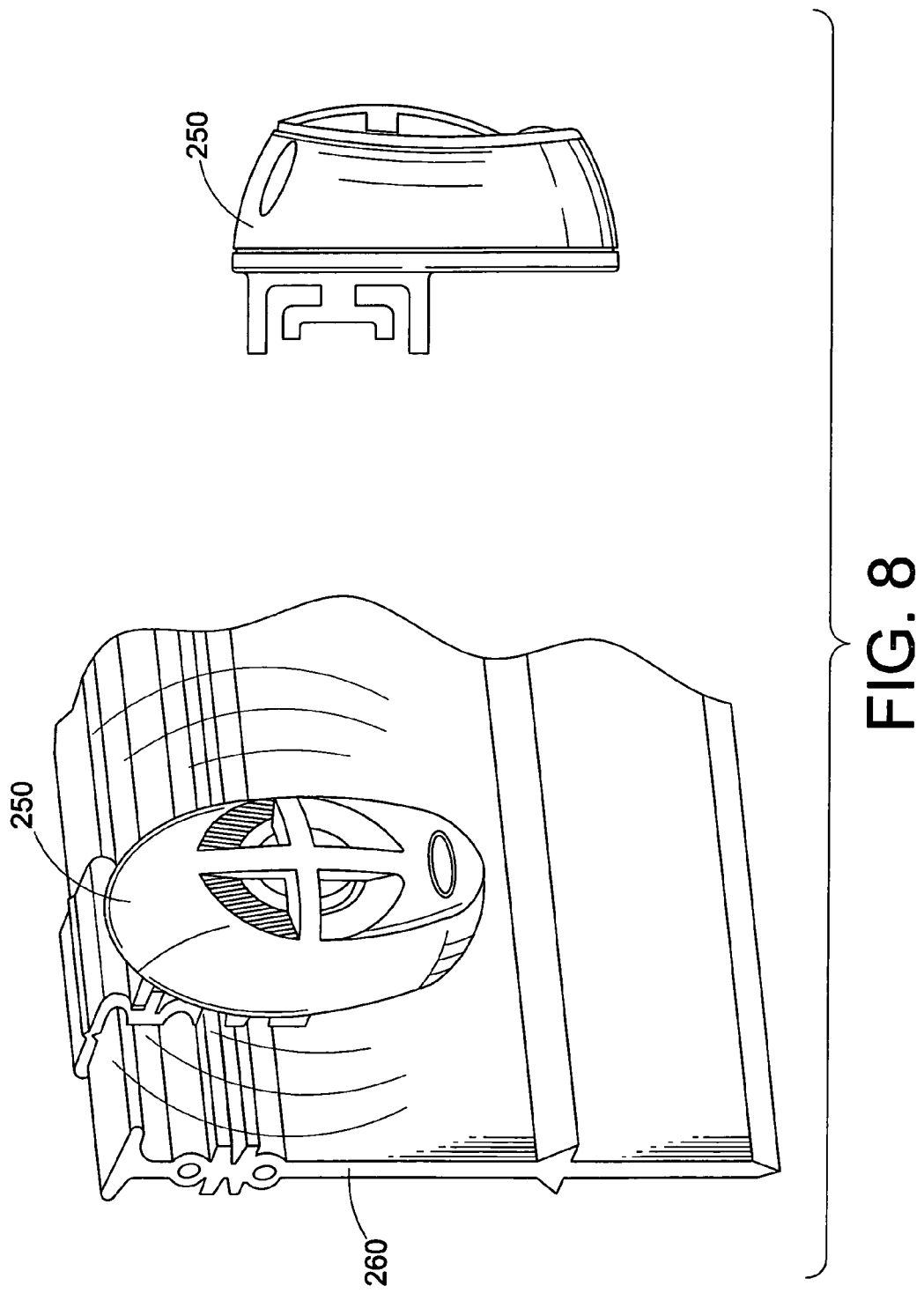
FIG. 8 illustrates an embodiment using a sonic horn with the edging assembly.

FIG. 8 shows a sonic horn 250 attached to an extrusion strip 260 which emits high frequency sound to create a hostile climate for bugs and other pests. A low voltage power supply limits coverage area, so as not to disturb household pets. A two part cavity houses the sonic horn.

Figure 9:
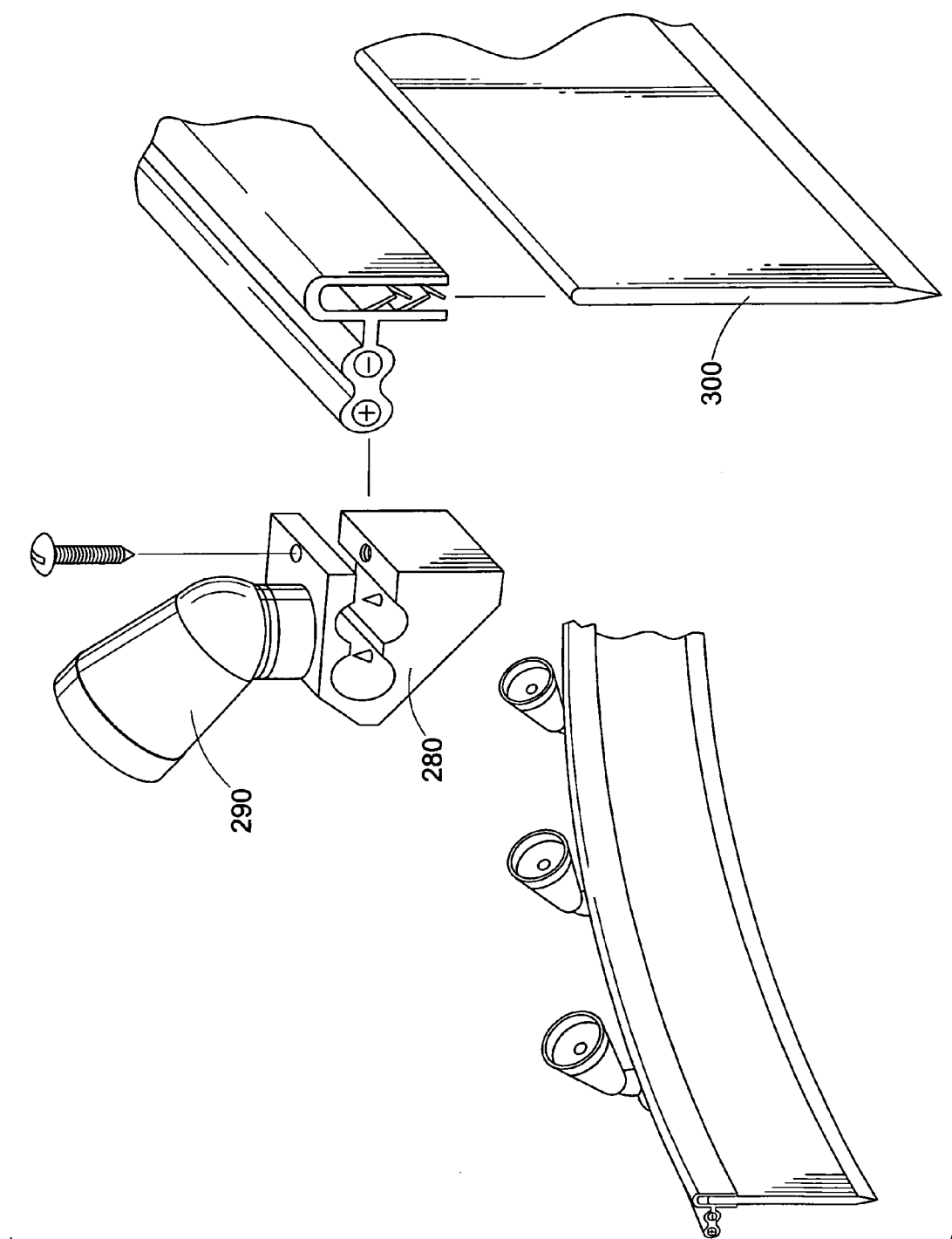
FIG. 9 illustrates another embodiment for mounting a spotlight onto the edging assembly; and, FIG. 10 illustrates another embodiment for mounting a spot light onto the edging assembly.
Figure 10:
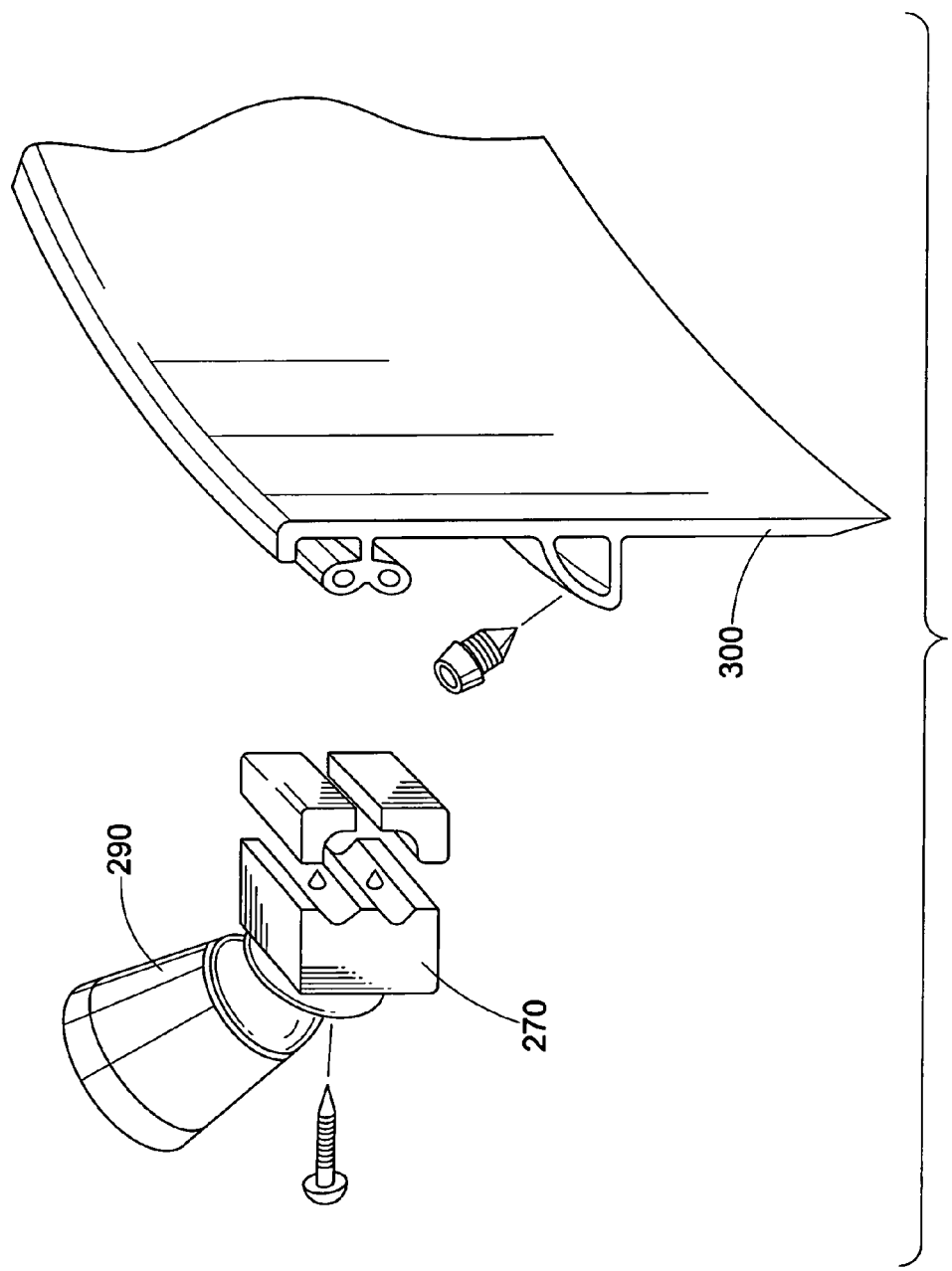

FIGS. 9 and 10 show various attachment members 270 and 280 for attaching a spotlight 290 onto an extrusion strip 300.

The invention has been described with reference to a preferred embodiment. Obviously, alterations and modifications will occur to others upon a reading and understanding of this specification. The invention is intended to include all such modifications and alterations insofar as they come within the scope of the appended claims or the equivalents thereof.

The invention claimed is:

1. A powered edging assembly for providing a voltage source at an edge of a garden or lawn comprising:
   an edging extrusion configured for in-ground placement at the edge and including an above-ground upper portion having contained wires extending along a length of the extrusion; the wires being insulated by penetrable sheaths; and
   an electrically powered device selectively positionable and fastenable on the extrusion, whereby contacts for the device penetrate the sheaths for communicating electrical power from the wires to the device; and
   wherein the contained wires are disposed within a separable, snap-on member configured for reception on the edging extrusion.

2. The assembly of claim 1 wherein the device comprises a lighting apparatus.

3. The assembly of claim 1 wherein the extrusion further includes a water conduit.

4. The powered edging assembly of claim 1, further comprising a connector which snaps onto and connects two adjacent edging extrusion members.

5. The powered edging assembly of claim 4, wherein said connector includes a first portion and a second portion, wherein said first portion comprises a plurality of tabs which extend into openings in a wall of said edging extrusion and into openings in an adjacent member.

6. The powered edging assembly of claim 1, wherein said edging extrusions is formed of plastic.

7. The powered edge assembly of claim 1, wherein said edging extrusion further comprises a groove extending along a longitudinal axis thereof for receiving said wires.

8. The powered edging assembly of claim 1, wherein said electrically powered device comprising a mounting block having a slot therein for sliding said mounting block onto an upper edge of said edging extrusion.

9. The powered edging assembly of claim 8, wherein said electrically powered device further comprises a walkway light assembly.

10. The powered edging assembly of claim 9, wherein said walkway light assembly comprises a housing having a slot therein for slidably mounting said housing onto said edging extrusion.

11. The powered edging assembly of claim 10, wherein said housing is formed of two half members secured together via fasteners.

12. The powered edging assembly of claim 10, further comprising a reflector which is mounted within a cavity in the housing.

13. The powered edging assembly of claim 12, further comprising a light bulb mounted on a socket positioned within said reflector.

14. The powered edging assembly of claim 13, further comprising a lens mounted within an opening in said housing and adjacent said light bulb.

15. The powered edging assembly of claim 14, further comprising a plug mounting within said housing for connecting said walkway light to said wires.

16. The powered edging assembly of claim 10, wherein said housing is formed of plastic material.

17. The powered edging assembly of claim 8, wherein said electrically powered device comprises a spotlight assembly.

18. The powered edging assembly of claim 17, wherein said spotlight assembly comprises a first housing having a slot therein for slidably mounting said housing to said edging extrusion.

19. The powered edging assembly of claim 18, wherein said first housing comprises two half members secured together via a fastener.

20. The powered edging assembly of claim 19, wherein said spotlight assembly first housing comprises a plug mounted therein for electrically connecting said spotlight to said wires.

21. The powered edging assembly of claim 20, further comprising a second housing, wherein said first housing comprises a yoke for pivotally connecting said first housing to said second housing.

22. The powered edging assembly of claim 21, wherein said second housing is formed of two half members secured together via fasteners.

23. The powered edging assembly of claim 22, further comprising a reflector mounted within said second housing.

24. The powered edging assembly of claim 23, further comprising a light bulb and socket engaging said light bulb mounted within said reflector.

25. The powered edging assembly of claim 24, further comprising a lens mounted within an opening of said first housing.

26. The powered edging assembly of claim 25, wherein said lens is curved.

* * * * *